United States Patent [19]

Farcasiu et al.

[11] Patent Number: 5,948,722

[45] Date of Patent: Sep. 7, 1999

[54] METHOD FOR PRODUCING IRON-BASED CATALYSTS

[75] Inventors: Malvina Farcasiu, Pittsburgh; Phillip B. Kaufman, Library; J. Rodney Diehl, Pittsburgh; Hendrik Kathrein, McMurray, all of Pa.

[73] Assignee: The United States of America as represented by the United States Department of Energy, Washington, D.C.

[21] Appl. No.: 08/949,405

[22] Filed: Oct. 14, 1997

Related U.S. Application Data

[63] Continuation-in-part of application No. 08/599,005, Feb. 9, 1996, abandoned.

[51] Int. Cl.$^6$ ............. B01J 27/128; B01J 27/06; B01J 23/745
[52] U.S. Cl. ............. 502/229; 502/224; 502/336; 502/338
[58] Field of Search .................. 502/338, 336, 502/325, 229, 224

[56] References Cited

U.S. PATENT DOCUMENTS

| | | | |
|---|---|---|---|
| 3,342,890 | 9/1967 | Croce | 260/680 |
| 3,775,286 | 11/1973 | Mukerjee et al. | 208/10 |
| 3,925,498 | 12/1975 | Stadig | 260/680 |
| 4,252,685 | 2/1981 | Schlinger et al. | 502/5 |
| 4,510,039 | 4/1985 | Simone et al. | 208/10 |
| 4,605,678 | 8/1986 | Brennan et al. | 518/700 |
| 5,214,015 | 5/1993 | Farcasiu et al. | 502/150 |

FOREIGN PATENT DOCUMENTS

93/19845  10/1993  WIPO ............. B01J 37/22

OTHER PUBLICATIONS

Modeling Coal Liquefaction. 1. Decomposition of 4-(1-Naphthylmethy) Bibenzyl Catalyzed by Carbon Black–Malvina Farcasiu and Charlene Smith–1991 American Chemical Society–pp. 83–87 No month.

Modified Iron Oxides: Catalysts for Acid Catalyzed Reactions, Sep. 1997.

"Modeling Coal Liquefaction. 3. Catalytic Reactions of Polyfunctional Compounds" *Energy & Fuels*, 1994, 8: This article described earlier work by one of the inventors and others relating to catalytic reactions under col liquefaction conditions. No month.

*Primary Examiner*—Steven Bos
*Assistant Examiner*—Alexander G. Ghyka
*Attorney, Agent, or Firm*—Lisa M. Soltis; Mark P. Dvorscak; William R. Moser

[57] ABSTRACT

A method for preparing an acid catalyst having a long shelf-life is provided comprising doping crystalline iron oxides with lattice-compatible metals and heating the now-doped oxide with halogen compounds at elevated temperatures. The invention also provides for a catalyst comprising an iron oxide particle having a predetermined lattice structure, one or more metal dopants for said iron oxide, said dopants having an ionic radius compatible with said lattice structure; and a halogen bound with the iron and the metal dopants on the surface of the particle.

44 Claims, No Drawings

METHOD FOR PRODUCING IRON-BASED CATALYSTS

This application is a continuation-in-part, of application Ser. No. 08/599,005 filed Feb. 9, 1996, now abandoned.

CONTRACTUAL ORIGIN OF THE INVENTION

The U.S. Government has rights in this invention pursuant to the employer-employee relationship of the Government to some of the inventors as U.S. Department of Energy employees at the Pittsburgh Energy Technology Center, and pursuant to 42 U.S.C. 5908 in respect to the inventor-employees of the Bayer Corporation.

BACKGROUND OF THE INVENTION

1. Field of the Invention

The present invention relates to a method for producing the catalyst and, more particularly, to iron-oxide based catalysts and a method for producing iron-oxide based catalysts for use in cracking, isomerization and transalkylation processes by reacting iron oxides doped with a lattice compatible metal with halogen compounds.

2. Background of the Invention

Many industrial processes involve acid-catalyzed reactions, such as cracking, hydrocracking, depolymerization, isomerization, alkylation, transalkylation, etc. The catalysts used in these processes are solids (e.g. zeolites, silica-alumina), liquids (ex. phosphoric acid, methane sulfonic acid, triflouromethane sulfonic acid, sludges of aluminum chloride, etc.) or gases (e.g. hydrofluoric acid).

Some metal chlorides or mixtures of metal chlorides have been used as acid catalysts. These metal chlorides include $AlCl_3$, $ZnCl_2$, $FeCl_3$ or mixtures of metal chlorides such as $AlCl_3$-$CuCl_2$ (in which $CuCl_2$ acts as a promoter).

Several shortcomings exist with the use of these inorganic halides in industrial settings, including: 1. their inherent highly corrosive characteristics, 2. the need to control rigorously the water content of the sludge containing the catalyst, 3. the difficulty to disperse the catalyst in the reaction mixture, resulting in the need to use large amounts of catalyst and, 4. the environmental hazards associated with the recovery and/or disposal of the used catalyst.

For example, the typical acid catalysts of zinc chloride and ferric chloride contain 52 weight percent and 65.5 weight percent of chlorine, respectively.

A need exists to develop methods to synthesize new acid catalysts that do not have the shortcomings of typical metal chloride catalysts. The process should minimize the use of halogen material. Finally, the resulting product should provide for its easy reclamation from reaction mixtures and, be stable.

SUMMARY OF THE INVENTION

It is an object of the present invention to provide a metal-based acid catalyst and a method for producing a metal-based acid catalyst that overcomes many of the disadvantages of the prior art.

It is another object of the present invention to provide a method for activating a metal-based catalyst precursor, prior to actual use. A feature of the invention is the production of a catalyst having active sites on the surface or shell of the catalyst. An advantage of the method is the elimination of the large amounts of halide, and concomitant materials handling problems associated therewith, that is necessary in typical procedures to maintain catalytic activity.

Yet another object of the present invention is to provide a method for activating metal-lattice substrates with lattice compatible metals and organic chlorides. A feature of the invention is the incorporation of chloride ions onto the substrates. An advantage of the invention is the elimination of corrosive problems associated with metal chlorides that are typically used in industrially situated, acid-catalyzed reactions.

Briefly, these and other objects and advantages of the present invention are provided via a method for producing acid catalysts comprising synthesizing an iron oxide doped with metal ions lattice-compatible with $Fe^{3+}$ or/and $Fe^{2+}$, exposing the doped iron oxide to a halogen compound and heating the iron oxide-halogen compound mixture. A lattice compatible ion is in this case, an ion that can replace $Fe^{2+}$ or $Fe^{3+}$ in the iron oxide lattice (similar ionic radius, same ionic charge).

The invention also provides for an acid catalyst in form of particles comprising a crystalline iron oxide, a metal dopant to said iron oxide, said dopant being compatible with iron oxide and a halogen chemically bound on the surface of the catalyst particle.

DETAILED DESCRIPTION OF THE INVENTION

Modified metal oxides containing small amounts of lattice-compatible metals as precursors for subsequent activation to shell-acid catalysts have been developed. The activation step consists of the treatment of the oxides, such as magnetites doped with small amounts of other lattice compatible metals, with halogen compounds at temperatures usually over 200° C. Preferably, the activation step includes heating to a temperature in the range of between about 225° C. and about 410° C., and, more preferably, to a temperature of about 225° C. Following the activation step, a catalytically active surface with a complex structure is formed containing $Fe^{3+}$ and $Fe^{2+}$ ions, other lattice compatible metal ions, halogen and oxygen ions. After the desired reaction is carried out, the catalyst is removed and subsequently reused. In the case of magnetic iron-oxide precursors, separation of catalyst material from the reaction mixture is possible by taking advantage of their magnetic properties.

When large surface area precursors are used, these catalysts are used in small quantities, and possibly even as disposable catalysts. In as much as all the active, halogen-containing sites are present only on a thin shell to the catalyst substrate, the overall quantity of halogen is very small. For example, in the case of one active catalyst fabricated via the method taught herein wherein a magnetite contains 0.5 weight percent of Zn, the chlorine content of the catalyst was 8.9 percent, with a surface area of 18 $m^2$/g. This compares to the 52 weight percent of chlorine and 65.5 weight percent of chlorine noted previously for the typical acid catalysts zinc chloride and ferric chloride, respectively.

Iron oxides with spinel structure may be used in the preparation of the catalyst, including, but not limited to, iron oxides such as gamma-$Fe_2O_3$, $Fe_3O_4$, or berthollide iron oxides of composition $(FeO)_{1-x}(Fe_2O_3)$, where $0<x<1$. Where $Fe^{2+}$ and $Fe^{3+}$ lattice positions are present, as in magnetite structures, several substitution metal ions having similar ionic radius with iron may be utilized. Substitution metal ions include but are not limited to metal ions of Zn, Cu, Mg, Ni, Co, Al, Ga, Mo, Cr, V, and Ti+Fe. For example, $Zn^{2++}$, $Cu^{2+}$, $Mg^{2+}$, $Ni^{2+}$, $Co^{2+}$ can be used to replace $Fe^{2+}$ in lattice positions. Similarly, $Al^{3+}$, 1/2 $[Ti^{4+}+Fe^{2+}]$, $Ga^{3+}$, $Cr^{3+}$, and $V^{3+}$ may be used to replace $Fe^{3+}$ in lattice positions during preparation. Upon heating, we found that these substitute ions diffuse to the surface of the particle and partially displace the original $Fe^{3+}$ and $Fe^{2+}$ ions at the surface of the iron-oxide particle. This surface diffusion results in a larger concentration of the added metal ions on the surface than in the bulk. Subsequent reaction of the iron ions and the substituted metal ions with halogen creates a surface having catalytic properties.

Heating of particles of magnetite doped with $Zn^{2+}$ and $Al^{3+}$ in the presence of an organic halide causes, the dopants to diffuse to the surface of the particle and at least partially replace $Fe^{2+}$ and/or $Fe^{3+}$ respectively, resulting in an increased concentration of the Zn and/or the Al on the surface. The resulting material proves to be an active and stable acid catalyst which maintains its catalytic activity after storage in air for weeks, even in humid conditions. The long shelf life of the catalyst of the invention is shown, for example in Example 4.

Heating of doped iron oxides, prior or concomitant with surface activation with a sulfur or sulfur containing compounds, can be used for the formation of active systems other than active acid catalysts, including Fe—S—Ni and Fe—S—Co combinations used as hydrotreating catalysts. Preferably, the activation step includes heating in the range of between about 200° C. and about 350° C., and, more preferably, to a temperature of about 200° C.

Several precursors containing magnetite with and without small amounts of $Zn^{2+}$ and/or $Al^{3+}$ were prepared. Catalyst precursors used in the following examples are disclosed in Table 1, infra. Generally, the magnetites used as catalyst precursors have crystal structures accommodating $Fe^{2+}$ and $Fe^{3+}$.

TABLE 1

Catalyst Precursors

| # Magnetite | Surface Area m²/g | Elemental Analysis, wt % | | |
|---|---|---|---|---|
| | | Fe | Zn | Al |
| 1. Isometric | 39.3 | 66.9 | 0 | 0 |
| 2. Needles, Zn | 37 | | 0.5 | 0 |
| 3. Isometric, Zn | 43.6 | 67.0 | 0.40 | 0 |
| 4. Isometric, Al | 37.9 | 67.1 | 0 | 0.4 |
| 5. Isometric, Al, Zn | 50.6 | 66.4 | 0.45 | 0.48 |

*Magnetite supplied by Bayer Corporation, Pittsburgh, PA.

As mentioned supra, while the examples provided below demonstrate chlorine-containing catalysts, other halogen containing compounds, those containing bromine and iodine for example, may be used.

Catalyst Preparation With Oxygen Present—Method A

In a first method, one part by weight of doped iron oxide (containing small amounts of other metals or metals substituted in the lattice) was heated in a closed container with 0.05–0.5 percent by weight organic halide for a given duration of time at a given temperature. Usually, the duration of heating is 0.5 to 5 hours and the temperature is selected from a range of between approximately 225° C. and 410° C. After this heating step, the container is opened and its contents dried in vacuum at temperatures of 80–300° C. for one hour. A more preferable iron oxide-to-organic chloride weight ratio range is 1:0.05 to 1:0.1.

Suitable organic halides for catalyst activation included organic halides such as methylene halides, carbon tetrahalide, trihalomethanes, where the halogen may be chlorine, bromine or iodine. Generally, any derivative of lower fraction alkyls is suitable (i.e., methane, ethane, propane or butane) as long as the compounds, upon thermal decomposition, do not liberate carbon which could otherwise reduce the surface area of the iron-based particle during catalyst activation.

Catalyst Preparation With Oxygen Absent—Method B

In a second method, doped iron oxide is heated under inert gas (for example, nitrogen, argon or helium) at 225° C. to 410° C. for 0.25 to 5 hours. The resulting material has an increased concentration of lattice compatible metals (other than iron) on the surface and is then activated as described above in method A to form the acid catalyst.

To avoid sintering of particles (which reduces surface area), the heating of the oxide-substituted metal-halogen mixture is preferably at a relatively slow rate. To maintain high surface areas, i.e., small particle sizes, low heating rates of between 1° C./minute and 3° C./minute are used, and relatively low final temperatures (225–250° C.) are utilized.

High surface areas may be maintained by passivation of the oxide particle surface with phosphoric acid. This is illustrated in Examples 9 and 11 below whereby nonpassivated magnetite lost 61 percent of its surface area upon activation (in Example 9). In contrast, the same magnetite, first passivated (in Example 11), lost only 25 percent of its initial surface area.

Low heating rates to reach the final temperatures, noted supra, facilitate both the dopant diffusion outwardly toward the surface of the particle, and the formation of the catalytic surface.

Catalyst production may be carried out at pressures on the order of 1–5 atmospheres, concomitant with the pressure created when the organic halide decomposes.

The activity of the resulting catalysts, as measured by degree of conversion, was determined by a micro-test, as described in Farcasiu, et al. Energy & Fuels 1994, 8, 920–924, and incorporated herein by reference. The test compound utilized was 4-(1-naphthylmethyl)bibenzyl, which is compound I, illustrated infra. The hydrogen donor utilized was 9,10 dihydrophenanthrene. The catalyst was present in 10–40 percent by weight of the test compound. The main catalytic reaction, under test conditions is the selective cracking of bond a (see formula compound 1)

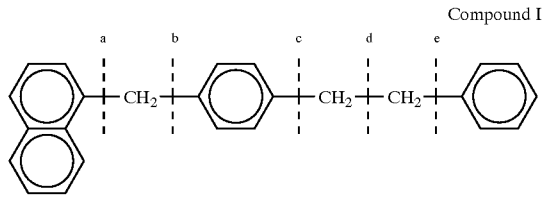

Compound I

To assess the catalytic activity of the invented class of catalysts, the catalyst was combined with Compound I to form a reaction mixture. In all examples, infra, the magnetite used as the precursor is identified with the numbers given in Table 1, supra.

EXAMPLE 1

187 mg of needle-Zn magnetite (#2 in table 1) and 18 mg methylene chloride were heated for 30 minutes at 390° C. in a closed glass tube. The product was dried in vacuum at room temperature for one hour to remove any trace of methylene chloride. The catalyst was stored in a glass vial, at room temperature.

EXAMPLE 2

25 mg of Compound I and approximately 100 mg of 9,10 dihydrophenanthrene were heated for 1 hour at 390° C. No reaction was observed.

EXAMPLE 3

25 mg of Compound I, approximately 100 mg of 9,10 dihydrophenanthrene and 2.5 mg fresh catalyst as prepared pursuant to Example 1, were heated for one hour at 390° C. The conversion of Compound I (see reference above) was 20.7 percent (average of two micro-tests) in the presence of 10 weight catalyst; the selectivity for the cracking of bond "a" was more than 90 percent.

EXAMPLE 4

The stability of the catalysts prepared under Method A was tested after storage at room temperature in a closed container. The conversion of I as a function of time since preparation is given in Table 2, infra.

TABLE 2

Conversion of Compound I versus days after preparation

| | Days after Preparataion | | | | |
|---|---|---|---|---|---|
| | 0 | 13 | 23 | 37 | 41 |
| Conversion *I, % | 20.7 | 21.9 | 25.8 | 25.0 | 25.1 |

*10% weight catalyst (based on Compound I)

EXAMPLE 5

To check the water-stability of a catalyst, prepared using Method A, the catalyst was first stored in air for 41 days. Results of that air storage are illustrated in Table 2. Another catalyst, stored in air for 41 days was tested after a 30 minute exposure to a water-vapor-saturated atmosphere at room temperature. And, a third catalyst, again initially stored in air for 41 days, was tested after overnight exposure to a water-vapor-saturated atmosphere at room temperature. The conversions of compound I for each of the three above scenarios was 25.1 percent, 22.5 percent and 8 percent respectively, whereby the catalyst was 10 percent by weight, based on Compound I.

EXAMPLE 6

The Zn, Al magnetite (#5, Table 1) was activated with methylene chloride at 225° C. The weight ratio methylene chloride to magnetite was 1:8. Catalysts B, C and D were obtained. The X-ray Photoelectron Spectroscopy (XPS) method of analysis was used to determine the surface composition of these catalysts as compared with the initial bulk composition. The results are given in Table 3. The conversion of Compound I is given for 40 percent weight of the catalyst, based on Compound I.

TABLE 3

Surface Composition of $CH_2Cl_2$-activated Catalysts

| Catalyst | Atomic Ratio on the Surface | | | | Conversion I |
|---|---|---|---|---|---|
| | Fe | Zn | Al | Cl | % |
| Magnetite #5 | 100 | 0.63 | 1.6 | 0 | 0 |
| B | 100 | 11.2 | 8.9 | 10.1 | 57 |
| C | 100 | 8.8 | 10.1 | 10.1 | 19 |
| D | 100 | 1.1 | 4.7 | 3.9 | 12 |

EXAMPLE 7

Methylene chloride activated magnetite #1 (5 hours at 225° C., in the presence of oxygen, method A) was tested for catalytic activity. The conversion of Compound I in the presence of 40 weight percent of the activated material was 0 percent.

EXAMPLE 8

Magnetite #3 and phosphoric acid surface-passivated magnetite #3 were activated with methylene chloride at 225° C. for 5 hours. The catalysts gave conversions of 18.8 percent and 34.6 percent respectively (concentration of catalyst was 40 percent based on the weight of Compound I present).

EXAMPLE 9

In a sealed glass tube, 100 mg magnetite #5 and 24 mg methylene chloride were heated at 1.7° C./min to 225° C. and then maintained at 225° for three hours. The fresh catalyst gave a conversion of 39.4 percent when using in 40 percent concentration (based on Compound 1). Surface area of the catalyst is 18.5 $m^2/g$.

EXAMPLE 10

In a sealed glass tube, 100 mg magnetite #2 and 24 mg methylene chloride were heated at 1.7° C./min to 225° C. and then maintained at 225° for three hours. The fresh catalyst gave a conversion of 74.5 percent when used in 40 weight percent concentration based on the amount of Compound I present. The catalytic activity of the two-day old catalyst was 69.5 percent. Surface area of the catalyst was 31 $m^2/g$.

EXAMPLE 11

Catalytic activities and surface areas of a methylene chloride activated magnetite #5 (catalyst E in table 4) and of a corresponding magnetite which was first phosphoric acid passivated #5 (catalyst F) were measured and compared. The results are illustrated in Table 4, infra:

TABLE 4

Activity and Surface Area for Activated v. Non-activated Magnetite

| Substrate | Surface Area (S.A.) $m^2/g$ | Conversion * of I % |
|---|---|---|
| Magnetite #5 | 50.6 | 0 |
| Catalyst E | 26.6 | 18.8 |
| Catalyst F | 37.9 | 46.2 |

* 40 weight % of catalyst based on Compound I present

EXAMPLE 12

A methylene chloride activated magnetite #2 (of table 1) was tested for catalytic activity at 10 weight percent catalyst concentration (based on Compound I present), one hour reaction time and at various temperatures. The results are depicted in Table 5, infra:

TABLE 5

Conversion rates using 10 weight percent catalyst

| ° C. | % |
|---|---|
| 390 | 14.3 |
| 400 | 32.2 |

TABLE 5-continued

Conversion rates using 10 weight percent catalyst

| ° C. | % |
|---|---|
| 410 | 50.4 |

EXAMPLE 13

Two samples of needle Zn magnetite (#2 in Table 1) were separately subjected to different methods of treatment. First, needle Zn magnetite was heated at 225° C. for 5 hours, and the heat treated material was recovered as Material A. Second, needle Zn magnetite was activated with methylene chloride at 225° C. for 5 hours, and the activated material was recovered as Material B. The weight ratio of methylene chloride to magnetite was 1:8.

Material A and Material B were obtained for analysis. X-Ray Photoelectron Spectroscopy (XPS) was used to analyze the surface composition of Material A and Material B, as compared to the initial bulk composition of the needle Zn magnetite prior to treatment (Magnetite #2). The results are provided in Table 6 below. The conversion of Compound I is given for 10 percent weight of the untreated needle Zn magnetite (#2, Table 1) and for 10 percent weight of Material B. To confirm that Material A does not act as a catalyst, 40 percent weight Material A was used in the catalytic testing, based on Compound I.

TABLE 6

Surface Composition of Materials according to Example 13

| | Atomic Ratio on the Surface | | | | |
|---|---|---|---|---|---|
| Material | Fe | Zn | Cl | P | % Conversion of Compound I |
| Magnetite #2 | 100 | 1.6 | 3 | 11 | 0 |
| Material A | 100 | 2.5 | 0 | 7 | 0 |
| Material B | 100 | 5.7 | 11 | 14 | 45 |

Example 13 demonstrates that activation by exposure to the halogenated compound (methylene chloride) is essential for providing material having acidic catalytic activity. Simply heating the metal doped iron oxide (Material A) does not produce a catalyst having an acidic function on its surface for promoting acid catalyzed reactions. In addition, it is known that neither iron oxide nor a mixed iron zinc oxide can have acidic activity.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for activating a metal-based catalyst precursor for promoting acid catalyzed reactions, prior to use in the acid catalyzed reaction, comprising the steps of:
   (a) supplying a catalyst precursor comprised of an iron oxide doped with at least one metal ion, the catalyst precursor having an interior and a surface;
   (b) activating the catalyst precursor by exposing the catalyst precursor to a halogen containing compound and heating the catalyst precursor, whereby halogen is bound at the surface and the surface concentration of the metal other than iron is greater than the concentration of the metal other than iron in the interior; and
   (c) recovering a storage-stable catalyst having active sites for promoting acid catalyzed reactions.

2. The method as recited in claim 1, further comprising the step of treating the catalyst precursor with an aqueous solution of phosphoric acid prior to activating the catalyst precursor.

3. The method as recited in claim 1, wherein said activation step comprises:
   (a) heating the catalyst precursor to produce the greater concentration of the metal other than iron at the surface, whereby the surface of the heated catalyst precursor has no active sites for promoting acid catalyzed reactions; and
   (b) exposing the heated catalyst precursor to the halogen containing compound to chemically bind halogen at the surface, whereby the surface concentration of halogen is less than the surface concentration of the metal ions and the iron ions combined, and the surface has active sites for promoting acid catalyzed reactions.

4. The method as recited in claim 3, wherein the catalyst precursor is heated in an inert atmosphere.

5. The method as recited in claim 1, wherein the halogen containing compound is heated with the catalyst precursor.

6. The method as recited in claim 1, further comprising the step of drying the recovered activated catalyst precursor in a vacuum at a temperature in the range of between about 80° C. to about 300° C.

7. The method as recited in claim 1, further comprising the step of selecting the iron oxide from the group consisting of alpha-$FeO_3$, gamma-$Fe_2O_3$, $Fe_3O_4$, and berthollide iron oxides of the composition $(FeO)_{1-x}(Fe_2O_3)$, where $0<x<1$.

8. The method as recited in claim 1, wherein the iron oxide is magnetite.

9. The method as recited in claim 1, further comprising the step of selecting the metal ion from a group consisting of metal ions having an ionic radius compatible with $Fe^{2+}$, $Fe^{3+}$, or a combination thereof.

10. The method as recited in claim 1, further comprising the step of selecting the metal ion from the group consisting of ions of Zn, Cu, Mg, Ni, Co, Al, Ga, Mo, Cr, V, and Ti+Fe.

11. The method as recited in claim 1, further comprising the step of selecting the metal ions $Zn^{2+}$ and $Al^{3+}$.

12. The method as recited in claim 1, further comprising the step of selecting the halogen containing compound from a group consisting of carbon tetrachloride, chloroform, methylene chloride, and hydrochloric acid.

13. The method as recited in claim 1, further comprising the step of selecting the halogen from a group consisting of chlorine, bromine, and iodine.

14. The method as recited in claim 1, wherein the activation step further comprises heating the catalyst precursor to a temperature of greater than about 200° C.

15. The method as recited in claim 1, wherein the activation step further comprises heating the catalyst precursor to a temperature in the range of between about 225° C. and about 410° C.

16. The method as recited in claim 1, wherein the activation step further comprises heating the catalyst precursor to a temperature of about 225° C.

17. The method as recited in claim 1, wherein the activation step further comprises heating at a rate in the range of between about 1° C./minute to about 3° C./minute.

18. The method as recited in claim 1, wherein the activation step further comprises heating for a time in the range of between about 0.5 hours to about 5 hours.

19. The method as recited in claim 1, wherein the activation step further comprises exposing the catalyst precursor to the halogen containing compound in a weight ratio of doped iron oxide to halogen of between about 1:0.05 to about 1:0.5.

20. A method for activating a metal-based catalyst precursor for promoting hydrotreating reactions, prior to use in the hydrotreating reaction, comprising the steps of:
(a) supplying a catalyst precursor comprised of an iron oxide doped with at least one metal ion;
(b) activating the catalyst precursor by exposing the catalyst precursor to a sulfur containing compound and heating the catalyst precursor; and
(c) recovering a storage-stable hydrotreating catalyst.

21. The method as recited in claim 20, further comprising the step of treating the catalyst precursor with an aqueous solution of phosphoric acid prior to activating the catalyst precursor.

22. The method as recited in claim 20, wherein the activation comprises exposing the catalyst precursor to the sulfur containing compound subsequent to heating the catalyst precursor.

23. The method as recited in claim 20, further comprising the step of selecting the iron oxide from the group consisting of alpha-$FeO_3$, gamma-$Fe_2O_3$, $Fe_3O_4$, and berthollide iron oxides of the composition $(FeO)_{1-x}(Fe_2O_3)$, where $0<x<1$.

24. The method as recited in claim 20, wherein the iron oxide is magnetite.

25. The method as recited in claim 20, further comprising the step of selecting the metal ion from the group consisting of ions of Zn, Cu, Mg, Ni, Co, Al, Ga, Mo, Cr, V, and Ti+Fe, wherein the metal ion has an ionic radius compatible with the iron ion of the iron oxide.

26. The method as recited in claim 20, wherein the activation step further comprises heating the catalyst precursor to a temperature of greater than about 200° C.

27. The method as recited in claim 20, wherein the activation step further comprises heating the catalyst precursor to a temperature in the range of between about 200° C. and about 350° C.

28. The method as recited in claim 20, wherein the activation step further comprises heating the catalyst precursor to a temperature of about 200° C.

29. The method as recited in claim 20, wherein the activation step further comprises heating at a rate of between about 1° C./minute to about 3° C./minute.

30. A storage-stable metal-based catalyst having active sites for promoting acid catalyzed reactions comprising:
(a) a crystalline iron oxide in the form of a particle, said iron oxide particle having an interior and a surface;
(b) at least one metal dopant having an ionic radius compatible with said crystalline iron oxide, the surface having a higher concentration of the metal dopant than the concentration of the metal dopant in the interior of the particle; and
(c) halogen chemically bound at the surface.

31. The catalyst as recited in claim 30, wherein the iron oxide is selected from the group consisting of alpha-$FeO_3$, gamma-$Fe_2O_3$, $Fe_3O_4$, and berthollide iron oxides of the composition $(FeO)_{1-x}(Fe_2O_3)$, where $0<x<1$.

32. The catalyst as recited in claim 30, wherein the iron oxide is magnetite.

33. The catalyst as recited in claim 30, wherein the metal dopant is selected from a group of metal dopants having an ionic radius compatible with $Fe^{2+}$, $Fe^{3+}$, or a combination thereof.

34. The catalyst as recited in claim 30, wherein the metal dopant is selected from the group group consisting of ions of Zn, Cu, Mg, Ni, Co, Al, Ga, Mo, Cr, V, and Ti+Fe.

35. The catalyst as recited in claim 30, wherein the metal dopants are $Zn^{2+}$ and $Al^{3+}$.

36. The catalyst as recited in claim 30, wherein the halogen is selected from the group consisting of chlorine, bromine, and iodine.

37. The catalyst as recited in claim 30, wherein the particle has a diameter in the range of between about 6 nanometers and about 30 nanometers.

38. The catalyst as recited in claim 30, wherein the particle has been exposed to an aqueous solution of phosphoric acid.

39. The catalyst as recited in claim 30, wherein the surface area of the particle is between the range of about 30 $m^2/g$ and about 200 $m^2/g$.

40. The catalyst as recited in claim 30, wherein the dopant is present in an amount in the range of between about 0.1% to about 3% relative to the weight of the iron oxide.

41. A method of catalyzing an acid based reaction, comprising:
(a) supplying a catalyst precursor comprised of an iron oxide doped with at least one metal ion, the catalyst precursor having an interior and a surface;
(b) activating the catalyst precursor by exposing the catalyst precursor to a halogen containing compound and heating the catalyst precursor;
(c) recovering a storage-stable catalyst having a greater surface concentration of the metal other than iron on the surface than the concentration of the metal in the interior, and having halogen present only on the surface of the catalyst; and
(d) subsequently subjecting a compound to a hydrogen or a hydrogen donor in the presence of the catalyst activated in step (b).

42. The method according to claim 41, further comprising the step of treating the catalyst precursor with an aqueous solution of phosphoric acid prior to activating the catalyst precursor.

43. The method according to claim 41, wherein the compound is 4-(1-naphthyl methyl) bibenzyl and the hydrogen donor is 9, 10 dihydrophenanthrene, and the reaction is a cracking reaction.

44. The method according to claim 41, wherein the compound is subjected to a hydrogen donor in an atmosphere containing no halogen.

* * * * *